UNITED STATES PATENT OFFICE.

ROGER N. WALLACH, OF WAPPINGERS FALLS, NEW YORK.

MANUFACTURE OF NAPHTHOL AND ALLIED PRODUCTS.

1,291,300.  
Specification of Letters Patent.  
Patented Jan. 14, 1919.

No Drawing.  
Application filed January 12, 1918. Serial No. 211,653.

*To all whom it may concern:*

Be it known that I, ROGER N. WALLACH, a subject of the Emperor of Germany, and a native of Alsace, residing at Wappingers Falls, county of Dutchess, State of New York, have invented certain new and useful Improvements in the Manufacture of Naphthol and Allied Products, of which the following is a specification.

My present invention relates to an improvement in the process of manufacturing naphthol and particularly to those steps which involve subjecting a naphthalene sulfonic salt solution to alkali fusion. My invention in its broadest aspect is covered by a concurrent application.

Hitherto in the manufacture of naphthol, at one stage of the process, a naphthalene sulfonic salt is added to caustic alkali fused at a temperature of about 300 degrees C., and the resultant mixture of naphtholate, caustic soda, sulfite, etc., is treated for production of the naphthol in a well known manner with which my present invention is not concerned.

For this purpose the naphthalene sulfonic salt has hitherto been evaporated to substantial dryness by the heat of live steam, and the cakes, flakes, or powder resulting have been added to the fused caustic soda, and stirred through the same at a temperature of about 300 degrees C. This process, as hitherto carried out, presents a number of obvious disadvantages incident to the evaporation of the sulfonic salts, all of which have been submitted to heretofore because it has been supposed that the addition of the original solution without evaporation directly to the fused alkali would be impracticable, owing to dangerously violent reaction, or the causing of excessive cooling of the fused alkali, thereby preventing reaction and creating mechanical difficulties.

I have discovered that this direct addition of the aqueous solution of naphthalene sulfonic salts is entirely practicable and that this process has very important advantages hereinafter pointed out.

My improved process may be carried out by the use of any appropriate apparatus such as will occur to those skilled in the art, the only essential elements being an appropriate apparatus for the production of the sulfonic salts, another for the fusion of the caustic alkali, and preferably a pipe and valve for conveying the former to the latter. Obviously, the sulfonic salt solution after manufacture may be stored in tanks prior to introduction into the fused caustic alkali, keeping it at a temperature at which the concentrated solution will not start to crystallize.

In the manufacture of naphthol the saturated naphthalene sulfonic salt solution made in the manner usual in the prior art is preferably heated to a temperature of about 100 degrees C., so as to produce as concentrated a solution as possible. The caustic alkali having been fused and kept at a temperature of about 300 degrees C., preferably in a vessel suitably covered to prevent loss due to ebullition during the reaction, the hot saturated sulfonic solution is led into the vessel containing the alkali through a pipe line. There is no limit to the rapidity with which the saturated sulfonic salt solution may be introduced into the fused caustic alkali, except that care must be taken not to lower the temperature of the fused liquid material below 280 degrees C. It is clear that my invention is not limited to the use of a pipe line, since the sulfonic solution might be poured into the vessel containing the alkali.

The proportions used will be such as have already been employed in this art, and it will be convenient to prepare the proper quantities of the sulfonic salt and caustic alkali in their respective vessels, so that when the vessel containing the salt solution is emptied, the appropriate mixture will have been produced within the vessel of caustic alkali. The mixture should be stirred during the reaction, and the operation will be completed shortly after the last of the salt solution has been added.

My process is productive of the following important advantages over the former processes involving evaporation of the sulfonic salts before adding them to the alkali:

1. The older process involved inevitable losses in the complicated handling of the very voluminous dry or semi-dry products. I avoid these losses and the added labor involved.

2. Owing to the evaporation being more or less incomplete, the sulfonic salts form cakes which are dissolved with some difficulty in the fused alkali, while in my process this difficulty is avoided, and there is an important saving of time, as the liquids mingle instantaneously and uniformly.

3. My process saves fuel because the heating is by direct application of fire to the sulfonic solution instead of by the use of expensive live steam in the evaporating apparatus. Moreover, the final evaporation in the older process is very inefficient, due to the thickening of the liquid. Furthermore, by addition of a hot solution instead of a cold salt, less fuel is required to bring the added salt up to the reaction temperature.

4. Economy is achieved in cost of apparatus, in space, labor and repairs.

5. The results of the final reaction are better and more uniform, since the shortening of the time of fusion reduces the proportion of objectionable tarry impurities.

6. In the evaporation process hitherto practised, accidental burning up of the whole fusion through over-heating of the thick mass often occurs, since it is obvious that the addition of the dry or semi-dry salt causes thickening and cooling, and makes it necessary to drive up the fusion temperature. This together with agitator troubles is avoided by my liquid-mixing process.

7. Economy is achieved by permitting a lower temperature of fusion. In the old process it has been generally customary and necessary, in order to insure complete fusion, to drive up the final temperature about 20 degrees C. above the temperature necessary for the fusion reaction. This driving up is avoided by my process.

It is to be noted in this connection that there is always a material charring in the old process, which I avoid entirely by the very fine division of the salt as it is presented to the alkali. The water of solution evaporates practically instantly on touching the hot alkali. As it is previously heated to 100 degrees C., the minimum of cooling results.

8. My process makes it possible to feed as gradually and uniformly as desired while fusing in closed vessels, either at ordinary, reduced or increased pressures, with exclusion of air. Gradual feeding which is highly beneficial and which is practised in open vessels has heretofore been impracticable when fusing in closed vessels. One of the merits of my invention is that this operation is not only made possible but very simple. This circumstance in itself is highly beneficial to the quality, yield and cost of the product obtained.

Furthermore I am enabled accurately to regulate the fusion temperature by controlling the stream of salt solution; increasing it as the temperature rises and vice versa. It is obvious that the convenience and ease of handling are greatly enhanced, since only one, or perhaps two, valves are used in the pipe line.

9. Economy is also achieved in the saving of material. In the process under the old methods it is necessary to have a large excess of caustic alkali. I have found that the excess of caustic alkali necessary for the completion of the reaction can be materially reduced by the use of my process.

The caustic soda generally employed may be replaced wholly or in part by caustic potash, calcium oxid, barium oxid, etc., as well understood in the prior art.

What I claim is:

1. As steps in the manufacture of naphthol, preparing an aqueous solution of napthalene sulfonic salt and adding the same to a quantity of caustic alkali in a state of fusion.

2. As steps in the manufacture of naphthol, preparing a concentrated aqueous solution of napthalene sulfonic salt at a temperature of about 100 degrees C. and adding the same to fused caustic alkali at a temperature of about 300 degrees C.

3. As steps in the manufacture of naphthol, preparing an aqueous solution of napthalene sulfonic salt and leading the same into a covered vessel containing fused caustic alkali.

4. As steps in the manufacture of naphthol, preparing a concentrated aqueous solution of naphthalene sulfonic salt at a temperature of about 100 degrees C. and leading the same into a covered vessel containing fused caustic alkali at a temperature of about 300 degrees C.

5. As steps in the manufacture of naphthol, preparing an aqueous solution of naphthalene sulfonic salt and gradually feeding the same into a closed vessel containing an aqueous solution of caustic alkali.

In testimony whereof I have affixed my signature to this specification.

ROGER N. WALLACH.